June 19, 1923.

F. WRIGHT

CONVEYING MACHINE

Filed June 11, 1919

Witnesses:
W. F. Kilroy
Harry R. L. White

Inventor:
Fred Wright
By Brown Boettcher & Dienner
Attys.

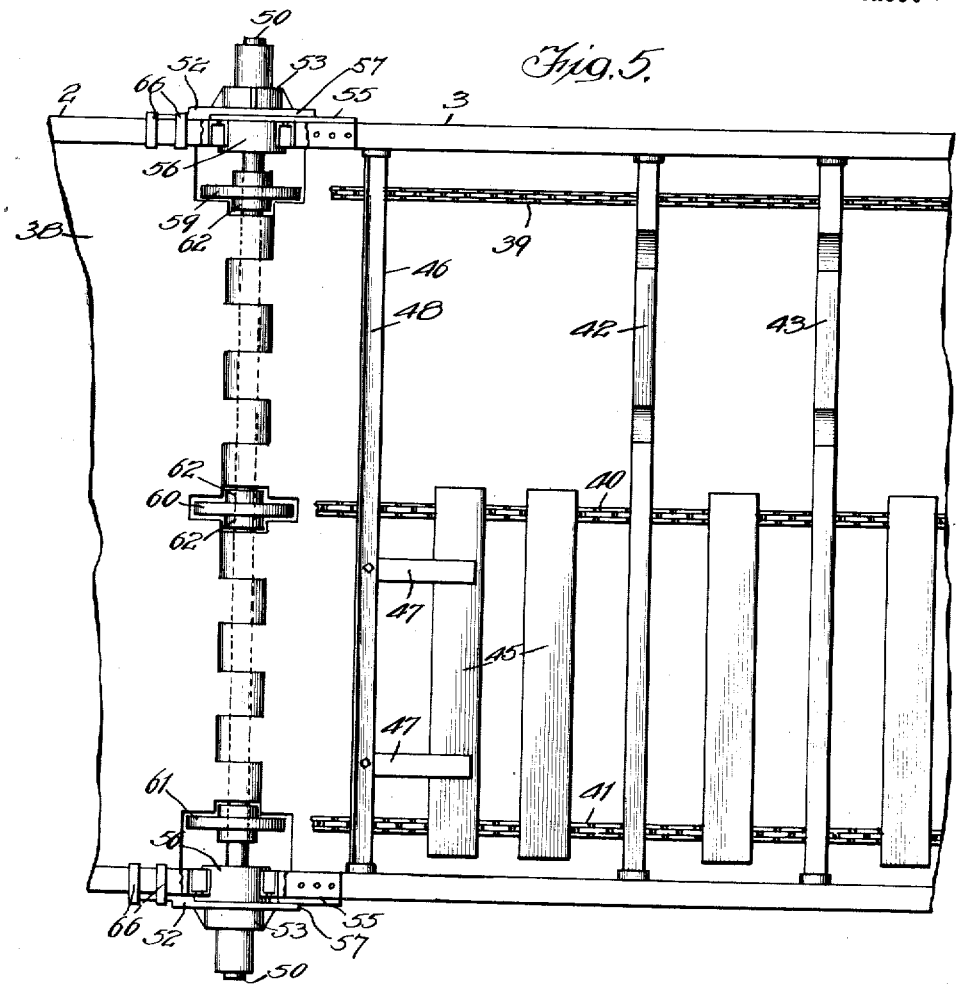
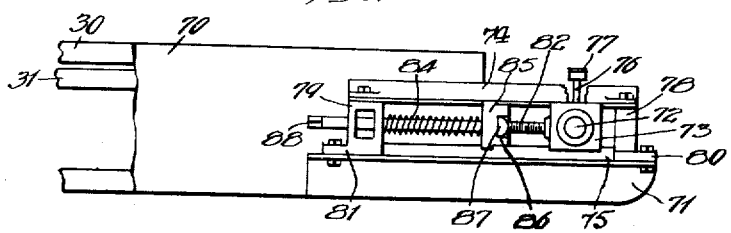
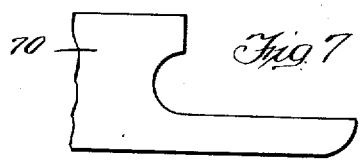

Patented June 19, 1923.

1,459,524

UNITED STATES PATENT OFFICE.

FRED WRIGHT, OF WAUKEGAN, ILLINOIS, ASSIGNOR, BY MESNE ASSIGNMENTS, TO STANDARD CONVEYOR COMPANY, OF NORTH ST. PAUL, MINNESOTA, A CORPORATION OF MINNESOTA.

CONVEYING MACHINE.

Application filed June 11, 1919. Serial No. 303,366.

*To all whom it may concern:*

Be it known that I, FRED WRIGHT, a citizen of the United States, residing at Waukegan, in the county of Lake and State of Illinois, have invented a certain new and useful Improvement in Conveying Machines, of which the following is a full, clear, concise, and exact description, reference being had to the accompanying drawings, forming a part of this specification.

My invention relates to conveying machinery and particularly provides a conveyor arm with a joint therein to permit of raising or lowering a part of the conveyor arm independently of the rest of the arm.

Where a fairly long carry is required, a continuous rigid conveyor arm for conveying articles as from a boat or barge has been found to be unwieldy and inconvenient. It is often desirable to make frequent adjustments of the height of the end of the arm because of variations in the height of the boat or barge or of the stack or pile from which or to which the material is being conveyed. If the conveyor arm is long and heavy the accurate adjustment of the same is a difficult matter. Another disadvantage of a long conveyor arm is the fact that variations in the height of the arm change the angle of the end of the arm so that the conveyor often will not clear the opening thru which it must carry. If the space into which the end of the arm must project is limited, any variations in the angle of the same may prevent the use of apparatus of this character.

According to my invention I provide a conveyor arm having a hinge therein so that the end of the arm may be swung about the hinge or pivot independently of the rest of the arm. This permits the conveyor arm to be employed in situations where a rigid arm could not operate satisfactorily and it also permits of easier loading and handling of the material or commodity upon the arm.

In order to accomplish such adjustability of the conveyor arm, I have found it necessary to overcome a number of serious practical difficulties which have hitherto prevented the use of such a jointed arm. In practice I have found that it is necessary to guide the edges of the web or carrier, and the provision of a joint in the arm which joint requires a gap in the guide, has hitherto prevented successful operation of such a device.

In order to overcome this difficulty I have invented a novel form of joint to permit a continuous conveyor carrier or web to be employed. I have provided means for bridging the gaps between the guides so that the edges of the conveyor carrier or web do not tend to become caught at the hinge in the arm.

I have also provided a spring takeup mechanism in combination with the above hinge so that the variations between the effective length of the arm and the conveyor or web may be automatically compensated for by this takeup mechanism.

I believe that it is broadly new to employ a conveyor arm with a hinge and a continuous conveying web or conveyor.

In order to acquaint those skilled in the art with the manner of constructing and practicing my invention I shall now describe in connection with the accompanying drawings one embodiment of the invention.

Figure 5 is a fragmentary plan view of the joint showing a portion of the conveyor or apron;

Figure 6 is a side view of the adjustable takeup and the mounting of the same upon the end of the conveyor arm;

Figure 7 is an inside elevational view of a part of the same; and

Figure 8 is a fragmentary sectional view taken on the line 8—8 of Figure 1.

Figure 1:
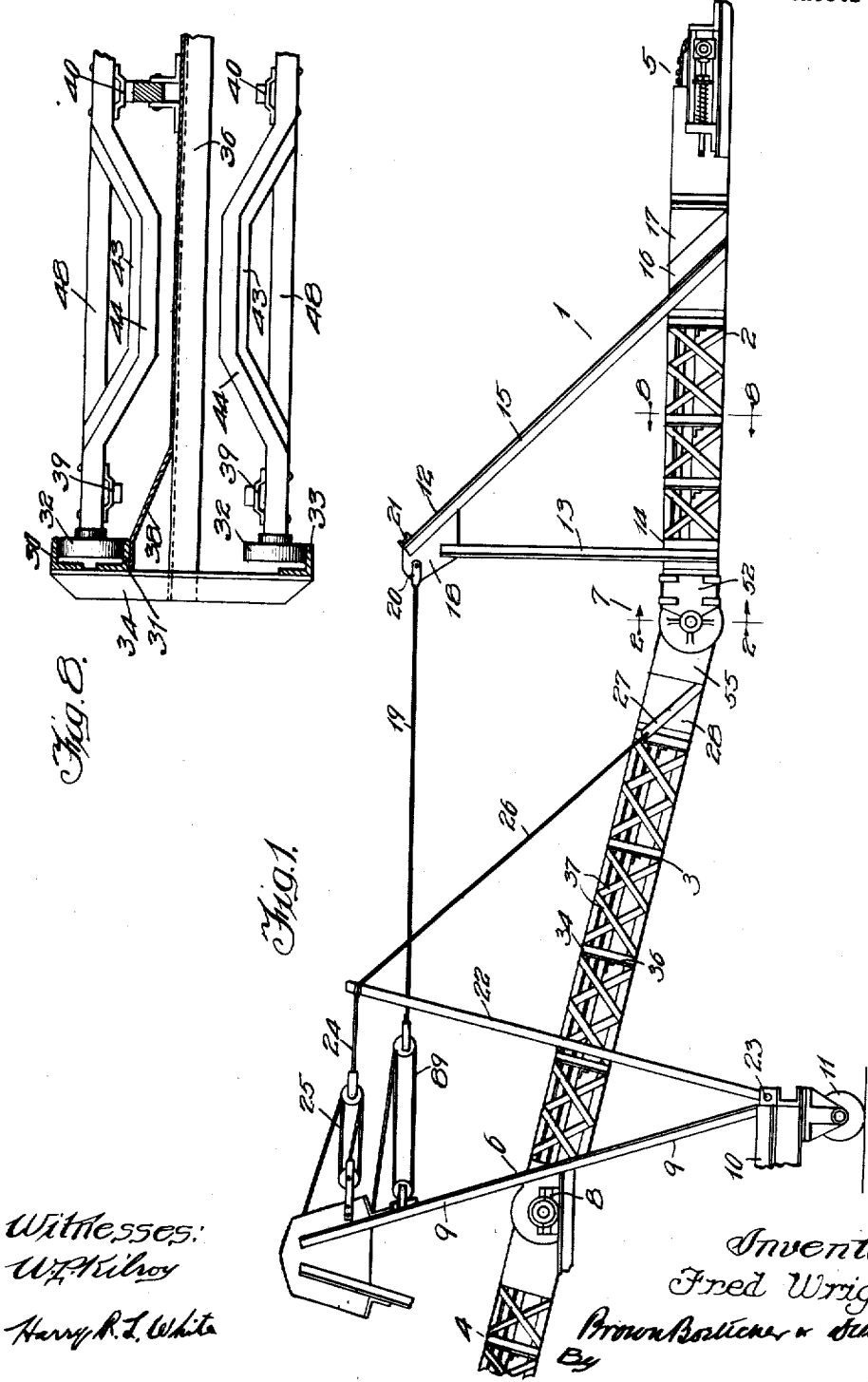
Figure 1 is a fragmentary side elevation of a machine embodying my invention.

As shown in Figure 1, the conveyor arm 1 comprising the three hinged sections 2, 3 and 4 has a continuous web or carrier 5 traveling over the same. The sections 3 and 4 are joined on a stationary hinge connection 6 and the sections 2 and 3 are joined by the movable hinge connection 7. The hinge connection 6 is similar in construction to the hinge connection 7 except that a part thereof is mounted in the stationary box or bearing 8 which box or bearing is mounted upon the frame 9; this frame is preferably mounted on a carriage 10 having wheels or rollers 11 permitting the entire device to be moved about.

Suitable driving mechanism is mounted on the carriage 10 for driving the conveyor web 5 and suitable hoisting mechanism which is not shown is provided for raising and lowering the sections 2, 3 and 4 or any further sections which may be provided.

The outer section is provided with a bracket construction 12 for moving the section about the pivot 7. This bracket construction comprises a vertical strut or post 13 preferably formed of angle iron and secured to a plate 14 on the section 2 at its lower end. The diagonal tension member 15 is likewise secured at its lower end to the section 2, in this case by means of the angle bracket 16 and plate 17. A gusset or corner plate 18 is secured to the upper ends of the angle bars 13 and 15 and to this gusset or angle plate 18 a hoisting cable 19 is attached as by means of the yoke or clevis 20. This construction is duplicated for the other side of the conveyor section arm 2 and the two sides are connected together by means of the channel member 21 which serves as a suitable brace. The hoisting cable 19 is connected thru suitable block and tackle to the upper end of the frame 9.

A swinging inverted U-shaped frame 22 is pivoted on the main frame 10 at the point 23 and is adapted to be swung toward and away from the frame 9 by means of the hoisting cable 24 and block and tackle 25. This inverted U-shaped frame 22 is connected by tie rods 26 to suitable brackets 27 secured on the plates 28 on the frame section 3.

The arm sections 2, 3 and 4 are built up of angle iron tension and compression members connected together by struts and lattice work as will be described more in detail.

As is illustrated in detail in Figure 8, each side of the conveyor arm section 2 is built up of longitudinal angle irons 30 and 31 lying at the upper side of the arm and forming a suitable guiding means for the carrier rollers 32 and a lower angle bar member 33 also running longitudinally of the arm and furnishing a track for the return of the carrier rollers 32. The two angle bars 30 and 31 face each other and form a channel or guide in which the edge of the conveyor is guided and the lower angle bar which faces inwardly also forms a channel or guide. The upper and lower channels are connected together by the struts 34 which preferably are pieces of angle iron cut and shaped as indicated in Figure 8. The two sides of the conveyor arm are connected together by the transverse angle bars 36 which are riveted at each side to the struts 34. The angle bars 30, 31 and 33 are connected together by the lattice work 37 which comprises slat bars. A sheet metal bottom 38 is mounted on the transverse bars 36, this bottom preventing the commodities conveyed from striking against the angle bars or being caught in any part of the mechanism. The edges of the bottom are bent upward so that they lodge against the angle bar 31, forming a smooth continuous surface completely across the conveyor arm. The carrier or web preferably consists of three strands of chain 39, 40 and 41, which strands of chain are connected together by suitable transverse members which may vary with the type of web or carrier employed. In the machine which I have illustrated, the web consists of a series of drop axles 42, 43 and 44, between the chains 39 and 40, which drop axles are straight between the chains 40 and 41. Between the drop axles, apron slats 45 are provided to form a continuous apron between the chains 40 and 41.

As illustrated in Figure 5 between the drop axle 42 and the drop axle 43 I have provided the straight axle 46 which bears a piece of angle iron serving as a cleat, against which the commodities to be conveyed may rest to prevent the slippage of the same upon the web or carrier. A pair of braces 47 are connected to the cleat or angle 48 to prevent tilting of the same, these braces 47 resting loosely against the adjacent slats 45. As shown in Figure 8, the axles 42, 43, 44 and 46 are all provided with rollers 32 at each end to run in the channel formed between the angle bars 30 and 31 at the sides of the arm section.

This combination of conveyor slats and drop axles permits articles of various kinds to be conveyed simultaneously on the same web or carrier; thus barrels or rolls may be carried by the drop axles while packages or commodities of a flexible or soft character may be laid upon the apron slats 45. The drop axles may be provided with different degrees of drop in order to better accommodate the handling of barrels and the like.

Figure 2:
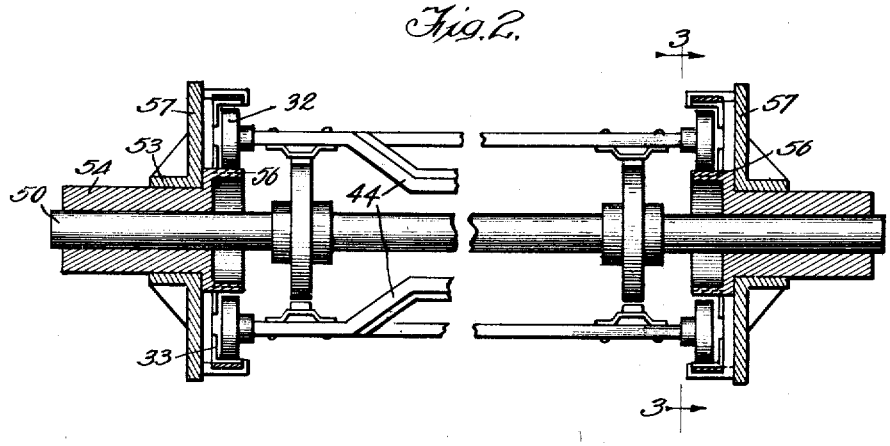
Figure 2 is a cross-sectional view taken on the line 2—2 of Figure 1.
Figure 3:
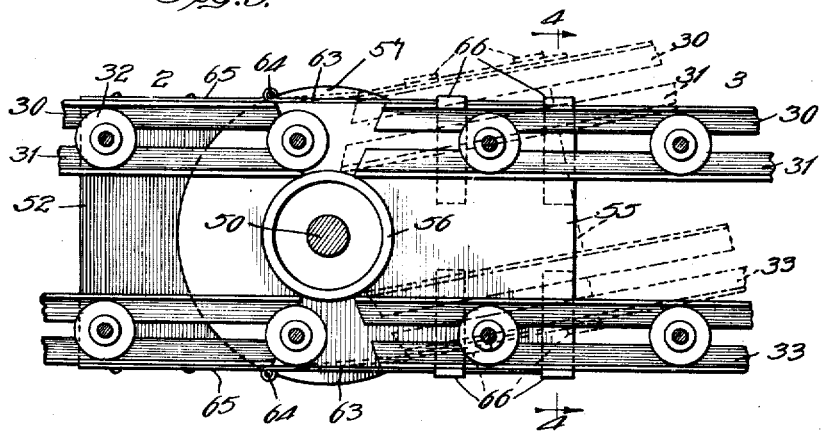
Figure 3 is a fragmentary sectional view taken on the line 3—3 showing an interior side view of the guides and the means for bridging the gaps in the guides.

The joint 7 between the sections 2 and 3 is shown in detail in Figures 2 and 3. The angle bars 30, 31 and 33 of each section are cut off on a diagonal radial line from the center of the shaft 50 which forms the pivot or hinge pin of the joint. The gaps thus formed between the tracks or guides permit of movement of the arm about the pivot when the two sections of the arm are to be varied in position with respect to each other. A pair of hinge plates 52 are connected to the section 2, these hinge plates being riveted to the angle bars 30, 31 and 33. These hinge plates have hollow circular bosses 53 forming an interior bearing for the cylinder stud members 54 which are mounted on the co-operating hinge plates 55. The co-operating hinge plates 55 are riveted to the corresponding angle bars of the section 3. The hinge plate 55 has a circular hub member 56 which is so placed as to be substantially tangent to the angle bars 31 of the different sections so that for all angular positions of the arm sections with respect to each other the rollers 32 will move from the angle bars 31 upon the hub 56 and across to the other corresponding angle bar as smoothly as possible. This hub need not be integral with the plate but may be secured thereto in any suitable manner, as its sole function is to bridge the gap between the angle bars 31. The hinge plate 52 has a circular offset member 57 which bridges the gap between the angle bars so that nothing may drop into said gap or be caught in the same. This guiding plate is offset so that it lies outside of the hinge plate 55 as will be seen from Figure 5. The chains 39, 40 and 41 run over the rollers 59, 60 and 61, which rollers are pivoted upon the shaft 50 and are held between suitable collars 62. The sheet metal bottom 38 is cut away to provide openings for these rollers and the ends of adjacent sections of the sheet metal bottom are interlaid or hinged about the shaft 50 so that a smooth joint will be presented at the hinge.

The hub 56 guards the opening between the guides for the rollers upon the inside portion of the same and special means is provided for the same general purpose for guarding the outside opening to prevent the rollers from coming out thru the gap at this point. This means, as I have shown, consists of a flexible strap 63, which is hinged at one end as at 64 to a stationary portion 65. This stationary portion is riveted or otherwise secured to the adjacent angle iron 30. The flat flexible member 63 extends under the straps or guides 66 which are secured to the hinge plate 55. This guarding member is duplicated on the bottom of the joint. The operation of the guarding member is apparent from the above description. When the two arm sections are moved with respect to each other so that the gap tends to become less, the flexible member 63 will be partially bent and at the same time moved longitudinally under the guides 66 so as to occupy less space between the ends of the guiding angle bars or channels. When the members are so moved as to increase the gap the guarding member 63 will be bent in the opposite direction and will also move longitudinally with respect to the guides 66 to bridge the increased gap. The rollers 32 on the axles pass freely between the hub 56 and the guarding member 63. Thus it is possible to have a continuous apron or carrier running over a joint in a conveyor arm of this character.

In order to work properly the carrier or conveyor web should have a definite tension at all times and this tension varies with the position of the sections with respect to each other. I have provided, in combination with the jointed sections, a takeup device which automatically takes up the slack in the carrier and maintains the same under proper tension. This device is shown in detail in Figures 6 and 7. A plate 70 is secured to the outer ends of the longitudinal angle bars 30, 31 and 33. This plate is cut away at its upper surface but projects forwardly at its lower side and is reinforced laterally by the angle bar 71 which is riveted to the plate 70 and to the lower angle bar 33 which extends forward after the angle bars 30 and 31 to provide a suitable support for the spring takeup. The sprocket shaft 72 is journaled in a sliding box 73 which is guided between the upper guide or way 74 and the lower guide or way 75. The upper guide 74 is provided with a central slot thru which passes a short section of pipe 76 bearing a grease cup 77 at its upper end. Thus the journal box 73 is free to move in the guides and the grease cup is always in accessible position. The guides 74 and 75 are separated at their ends by the posts 78 and 79. These posts are provided with wings or pedestals 80 and 81 respectively for bolting the same to the horizontal flange of the angle bars 71.

A threaded rod 82 passes thru a hole in the post 79 and engages at its inner end in a socket in the bearing box 73. This threaded rod is held in contact with the socket in the box by means of the spring 84 which spring is under a certain tension, being compressed between the posts 79 and the spring pad 85. The spring pad 85 is provided with wings for guiding the same upon the guides 74 and 75. The spring pad 85 is also provided with horizontal wings or flanges 86 forming a socket between them for receiving the square nut 87 which is threaded upon the rod 82. The rear end of the rod 82 is squared as is indicated at 88 to permit placing the spring 84 under greater or less tension by turning the screw threaded rod 82 in the nut 87.

Figure 4:
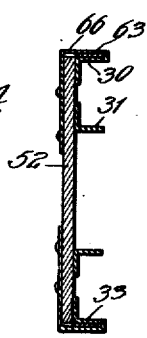
Figure 4 is a sectional view taken on the line 4—4 of Figure 3.

The hinge joint 6 between the sections 3 and 4 of the conveyor arm is of substantially the same construction as illustrated in Figures 2, 3 and 4 for the joint 7. However, in connection with this joint the outer end of the bearing stud 54 is journaled in the stationary bearing box 8 as is indicated in Figure 1, so that this joint 6 is relatively stationary and the arm sections 3 and 4 swing about the same as a pivot.

The operation of the device as a whole is readily apparent from the above description. If it is desired to raise or lower the sections 2 and 3 the hoisting cables 25 and 89 are suitably operated. Independent operation of the outer section 2 may be accomplished by suitable manipulation of the cable 25. The tendency to tighten or slacken the carrier, due to the shifting of the position of the sections with respect to each other is taken up by the spring takeup at the outer end of the arm. The gap between the guides is closed on the inner side by the circular hub and upon the outside by the flexible guarding member.

Instead of employing the articulated members 63 and 65, any other construction suitable might be substituted, if desired.

I do not intend to be limited to the details of construction shown and described.

I claim:

1. In combination, a plurality of hinged plate members, angle irons forming guides secured to each of the plate members, one of said members having a cylindrical bearing portion, a shaft passing thru the bearing portion, the other plate member having a bearing box embracing a portion of the cylindrical bearing portion, one of said members having a cylindrical hub portion adapted to be substantially tangent to said guides, and a conveyor web having rollers adapted to run thru said guides and over said hub or boss.

2. In combination, a plurality of hinge members pivoted to each other in pairs, guide members on each side of the pivots on said hinge members, circular bosses on certain ones of said hinge members, said bosses being substantially tangent to said guides, and a conveyor web guided in guides and adapted to run over said bosses.

3. In combination, a pair of hinge members having channels forming guides connected thereto, said hinge members having a boss with a circular face lying substantially tangent to one of the channels and a web having rollers adapted to run in said guides and over said boss.

4. In combination, a conveyor arm having two sections pivoted together, said sections comprising a pair of guiding channels for guiding the rollers of a conveyor web against upward or downward play, said channels being spaced apart at the pivot, a circular boss concentric with the pivot between the end of the channel at one side and tangential to said channels forming a bearing for the rollers, and a guiding plate between the ends of the channel at the other side.

5. In combination, a conveyor comprising arms mounted on pivoted plates, upper and lower pairs of channels connected to said plates, a continuous conveyor web having rollers guided in said channels, said channels having their ends spaced apart at the joints of said plates, a hub concentric with the joint and tangential to said channels to form a bearing for the rollers in transit, and an outer guard for the gap between said channels.

6. In combination, a conveyor arm comprising two sections pivoted together, said sections each having a guiding channel, said channels being adapted to lie in line with each other, but spaced away from each other when the sections lie in a straight line, a circular member lying between the ends of the channels adjacent the pivot and in alignment with the channels, and a guarding member adapted to span the gap between the ends of the channels on the side of the channels remote from the pivot.

7. In combination, a conveyor arm comprising two sections pivoted together, a continuous conveyor web passing over said sections and driven only from the free end of one of said sections, said arms having guiding members upon each side of the pivot for guiding the edges of the conveyor web, said guiding members being spaced apart by a gap but being adapted to lie in substantially the same plane for all positions of the arm sections, and means at the pivot above and below the same for guiding the edge of the conveyor web over the gap.

8. In combination, a pair of conveyor arms pivoted together, said arms having upper and lower guiding members along the margins thereof, an endless conveyor web traversing said arms and arranged between the guides, rollers on the conveyor web moving in said guides, said guides being spaced apart at the pivot, interlocking plates carried by said guides and adapted to be rotated about the pivot, hubs carried by the pivot and tangentially bridging the gaps between both the upper and lower guides to receive the rollers when passing over or under the pivot, and articulated means outside the path of the rollers for joining the guides.

9. In combination, a plurality of hingedly connected frames, tracks on said frames, rollers running on said tracks, a conveyor carried by said rollers, a pintle forming the pivotal connection between said sections and hubs carried by said pintle in alignment with said tracks, for bridging the gap between the ends of the tracks in all positions of adjustment.

10. In combination, a support, a conveyor section pivoted on said support, a second section pivoted on said first section, tension links connected to each section near its free end and acting along a line offset from the axis of pivotal support, and individual means for controlling the length of said tension links.

11. In combination, a support, a conveyor section pivoted on said support, a second section pivoted on said first section, tension links connected to each section near its free end and acting along a line offset from the axis of pivotal support, and individual means for controlling the length of said tension links, the tension link for said second section acting along a line offset from the axes of pivotal supports of both sections.

In witness whereof I hereunto subscribe my name this 21 day of May, 1919.

FRED WRIGHT.

Certificate of Correction.

It is hereby certified that in Letters Patent No. 1,459,524, granted June 19, 1923, upon the application of Fred Wright, of Waukegan, Illinois, for an improvement in "Conveying Machines," errors appear in the printed specification requiring correction as follows: Page 4, line 44, claim 3, strike out the words "channels forming", and line 47, for the word "channels" read *guides;* and that the said Letters Patent should be read with these corrections therein that the same may conform to the record of the case in the Patent Office.

Signed and sealed this 17th day of July, A. D., 1923.

[SEAL.]

WM. A. KINNAN,
*Acting Commissioner of Patents.*